United States Patent
Mathijssen et al.

(10) Patent No.: US 11,406,118 B2
(45) Date of Patent: Aug. 9, 2022

(54) METHOD AND ASSEMBLY FOR PREPARING A DRINK BASED ON FROZEN FOOD

(71) Applicant: ALBERTS NV, Wijnegem (BE)

(72) Inventors: Glenn Mathijssen, Brussels (BE); Phillippe Hennin, Tervuren (BE); Stefan Maas, Antwerp (BE); Maarten Geerinck, Dendermonde (BE); Merijn Sanders, Antwerp (BE); Koen Beyers, Wuustwezel (BE); Sten Verhaegen, Deurne (BE)

(73) Assignee: ALBERTS NV, Wijnegem (BE)

( * ) Notice: Subject to any disclaimer, the term of this patent is extended or adjusted under 35 U.S.C. 154(b) by 444 days.

(21) Appl. No.: 16/302,504

(22) PCT Filed: May 17, 2017

(86) PCT No.: PCT/IB2017/052911
§ 371 (c)(1),
(2) Date: Nov. 16, 2018

(87) PCT Pub. No.: WO2017/199182
PCT Pub. Date: Nov. 23, 2017

(65) Prior Publication Data
US 2019/0166872 A1 Jun. 6, 2019

(30) Foreign Application Priority Data
May 18, 2016 (BE) .................................. 2016/5345

(51) Int. Cl.
| | |
|---|---|
| A23G 9/04 | (2006.01) |
| A23G 9/22 | (2006.01) |
| A23G 9/28 | (2006.01) |
| A23G 9/30 | (2006.01) |
| A23G 9/42 | (2006.01) |
| A23L 2/02 | (2006.01) |
| A47J 43/044 | (2006.01) |

(52) U.S. Cl.
CPC .............. *A23G 9/045* (2013.01); *A23G 9/22* (2013.01); *A23G 9/283* (2013.01); *A23G 9/30* (2013.01); *A23G 9/42* (2013.01); *A23L 2/02* (2013.01); *A23G 9/228* (2013.01); *A47J 2043/04463* (2013.01); *A47J 2043/04472* (2013.01)

(58) Field of Classification Search
CPC ........ A23G 9/045; A23G 9/228; A23G 9/283; A23G 9/30; A23G 9/42
USPC ........................................................ 426/565
See application file for complete search history.

(56) References Cited

U.S. PATENT DOCUMENTS

| | | | |
|---|---|---|---|
| 5,121,855 A | 6/1992 | Credle, Jr. | |
| 9,155,330 B1 | 10/2015 | Shtivelman | |
| 2002/0131324 A1* | 9/2002 | Farrell | A23G 9/045 366/147 |
| 2002/0194999 A1 | 12/2002 | Ervin | |
| 2003/0145734 A1 | 8/2003 | Ervin | |
| 2012/0087203 A1 | 4/2012 | Williams et al. | |

FOREIGN PATENT DOCUMENTS

| | | | |
|---|---|---|---|
| CN | 101553128 A | 10/2009 | |
| CN | 103402410 A | 11/2013 | |
| CN | 104780768 A | 7/2015 | |
| CN | 206696950 U | 12/2017 | |
| JP | 01-224036 H | 9/1989 | |
| JP | 5-201491 A | 8/1993 | |
| JP | 2002-085952 A | 3/2002 | |
| JP | 2010-273973 A | 12/2010 | |
| JP | 2012-510940 A | 5/2012 | |
| WO | 98/53701 A1 | 12/1998 | |
| WO | 2007/091265 A2 | 8/2007 | |
| WO | 2007091265 A2 | 8/2007 | |
| WO | 2009/059405 A1 | 5/2009 | |
| WO | 2010/077700 A1 | 7/2010 | |
| WO | 2012050999 A2 | 4/2012 | |
| WO | 2014067987 A1 | 5/2014 | |
| WO | WO-2014115073 A1 * | 7/2014 | ............ A47J 31/405 |

OTHER PUBLICATIONS

International Search Report received from the European Patent Office in International Application No. PCT/IB2017/052911 dated Sep. 13, 2017.
Notice of Reasons for Rejection in related Japanese Office Action No. 2019-513496 dated Dec. 7, 2020.

(Continued)

*Primary Examiner* — Jyoti Chawla
(74) *Attorney, Agent, or Firm* — The Marbury Law Group, PLLC

(57) ABSTRACT

A method and assembly for preparing a drink based on frozen food comprises storing frozen food in various containers in the form of first granular materials and under deep-freeze conditions, crushing a portion of at least one of the first granular materials into a second granular material, and placing the second granular material into a cup. A first liquid is added to the cup at a temperature of at least 50° C. The cup, filled with the foods and possibly the first liquid, is closed, and the content of the cup is ground into a homogeneous mass. Lastly, the cup is opened and served.

10 Claims, 4 Drawing Sheets

(56) References Cited

OTHER PUBLICATIONS

Previously submitted First Office Action received in corresponding Chinese Patent Application No. 2017800345390, received from the Chinese Patent Office, dated Nov. 23, 2021, 18 pages, (along with English Translation of the Office Action, 15 pages).

First Office Action received in corresponding Chinese Patent Application No. 2017800345390, received from the Chinese Patent Office, dated Nov. 23, 2021, 18 pages, (along with English Translation of the Office Action, 15 pages).

* cited by examiner

METHOD AND ASSEMBLY FOR PREPARING A DRINK BASED ON FROZEN FOOD

Related Applications

This application is the U.S. national phase entry under 35 U.S.C. § 371 of P.C.T. Application No. PCT/IB2017/052911, filed May 17, 2017, which claims the priority benefit of Belgium Patent Application No. BE 2016/5345 filed May 18, 2016. Applications PCT/IB2017/052911 and BE 2016/5345 are incorporated herein by reference in their entirety.

FIELD OF THE INVENTION

This invention concerns methods and assemblies, systems, and devices, in particular automatic dispensers, for preparing a drink based on frozen foods, e.g., a smoothie.

BACKGROUND

The preparation of a drink comprising both the juice and the pulp of fruit and/or vegetables in an automatic dispenser is known from WO 2007/091265, Nuriely Eran, Aug. 16, 2007. To this end, fruit and vegetables are stored in cooled compartments and chopped into very fine particles. The chopped particles are added to a drink based on milk or fruit juice. One disadvantage of such a device is that it is difficult to store fresh fruit and vegetables for longer periods of time without adding preservatives. Additionally, these stored fresh ingredients quickly lose their attractive appearance, and thus do not appear appetising to a user.

Other automatic dispensers, as described in WO 2009/059405, Bertone Holdings Inc, May 14, 2009, prepare such drinks based on crushed ice and liquid preparations comprising the necessary flavours. The liquid preparations are stored in similar beverage dispensers in liquid form. One disadvantage of such preparations is that a large amount of flavourings must be added to the crushed ice in order to obtain a flavour desired by the end user. If natural flavours are used, this means that such a beverage comprises a very large equivalent amount of fruit and vegetables, and accordingly contains an excess of sugars and other nutrients. In order to be able to store such liquid preparations over longer periods of time, these are always pasteurised, which necessarily results in a loss of flavour. An additional disadvantage of such automatic dispensers is that storage in liquid form is unattractive to customers.

U.S. Pat. No. 9,155,330, Shtivelman Aleksey, Oct. 13, 2015, describes an automatic dispenser provided in order to prepare a drink based on frozen foods. Several cooled containers comprise different types of foods. Each container comprises an outlet mechanism in order to remove the foods from the containers. They are drained into a blender carafe, where, after adding a liquid, they are ground into a homogeneous beverage that is subsequently dispensed into a cup. Frozen foods may be stored in the dispenser over a long period of time without significant loss of nutrients and flavour. Additionally, preservatives are not required.

One disadvantage of the aforementioned automatic dispenser is that a significant quantity of prepared beverage remains in the blender carafe and the supply line leading to the cup. These components must additionally be thoroughly cleaned between consecutive uses, which involves significant water consumption. The surface area to be cleaned is also considerable, thus increasing the likelihood of spreading bacteria.

SUMMARY

One objective of this disclosure is to provide an assembly, e.g., in the form of an automatic dispenser, and a corresponding method that overcome the aforementioned disadvantages.

One objective of this disclosure is to provide an assembly, e.g., in the form of an automatic dispenser, and a corresponding method, for preparing a drink based on frozen foods that operates more efficiently and/or faster than prior-art automatic dispensers and methods.

One objective of this disclosure is to provide an assembly and a corresponding method that allow the (automatic) preparation of a drink based on frozen foods that is more healthful and flavourful than prior-art automatically prepared drinks, and comes as close as possible to a homemade drink based on fresh foods.

According to some aspects of this disclosure, a method for preparing a drink based on frozen foods is provided. The method comprises storing the frozen foods in various containers in the form of first granular materials and under deep-freeze conditions, and placing part of the foods in a cup. Advantageously, a first liquid is added to the cup. The cup, filled with the foods and possibly the First liquid, is closed, and the content of the cup is ground into an advantageously homogeneous and/or drinkable mass. The method lastly comprises opening and serving the cup.

According to a first aspect, as set forth in the following claims, part of at least one of the first granular materials is crushed into a second granular material, and the second granular material is placed in the cup and ground. Thus, the foods can be frozen and stored in the form of coarser pieces, which improves their attractiveness, taste, and food value. Such coarser pieces are advantageously standard formats for frozen fruit and vegetables that are already commercially available. Advantageously, automatic supply of the first granular material to the crushing unit is provided. The crushing of the first granular material before it is placed in the cup has the further advantage that the grinding process is simplified. The smaller pieces make it easier for a grinder to enter the cup. The cup, which will be the cup in which the drink is ultimately served and consumed by the consumer, does not require a heavy support, thus not requiring heavy constructions. Additionally, the grinding time is shortened, such that the grinding causes less warming of the drink. This, too, results in better preservation of the flavour of the drink.

According to other aspects of this disclosure, an assembly, a device, or a system for preparing a drink based on frozen foods is provided. The assembly comprises several containers, each provided for storing foods under deep-freeze conditions in the form of a first granular material, a cup holder, optionally a liquid supply, a closure for the cup, and a grinding unit for grinding the foods to an advantageously homogeneous and/or drinkable mass in the cup. The assembly comprises an advantageously linear guide provided to position the closure of the grinding unit relative to the holder.

According to a second aspect, as set forth in the following claims, the assembly comprises a device for crushing the first granular material into a second granular material, the crushing device being connected with the several containers. The crushing device advantageously comprises an outlet arranged so as to correspond to a position of the cup. The cup thus receives the foods after they have been crushed into the second granular material. Such an assembly allows for the advantages described in reference to the method to be obtained.

According to a third aspect, the holder comprises an opening surrounded by an edge of the holder. The cup advantageously has a protruding rim, the protrusion being advantageously at least partially bent and at least partially compressible. The holder is provided in order to receive the cup in the opening, such that the cup is supported by the edge of the holder. Advantageously, the cup is suspended exclusively by the protruding rim in the holder. The closure and the holder are movable relative to one another. Advantageously, a compressive force is applied to the rim of the cup when the closure is pressed against the holder, which results advantageously in an at least partial compression of the protruding rim. Additionally or alternatively, the holder and/or closure advantageously comprise a resilient material in contact with the rim of the cup.

Such an elastic material advantageously has a suitable friction coefficient, preventing rotation of the cup in the holder during the operation of the grinding device. Such a material may be in the form of a seal with dimensions corresponding to the rim of the cup. Such an arrangement advantageously allows for the use of cups with a circular rim that are commonly commercially available and thus cheaper than cups having different shapes. It is thus possible to grind the frozen foods directly in such cups, which may advantageously be disposable cups, without having to take complicated measures to prevent the rotation of the cup.

According to a fourth aspect, applicable both to methods and to assemblies according to the aforementioned aspects, following the grinding and prior to the opening of the cup, a quantity of water is added to the cup. This is made possible by providing a liquid supply line through an opening in the closure. A control unit is coupled with the grinding unit and the liquid supply. The control unit is optionally programmed or set in order to operate the liquid supply prior to actuating the grinding unit in order to add a first amount of liquid into the cup. The control unit is advantageously programmed or set in order to operate the liquid supply after actuating the grinding unit in order to add a second amount of liquid into the cup. This measure surprisingly allows for the easy removal of the closure from the cup. Indeed, it has been surprisingly found that negative pressure may arise during grinding in the cup, which may suction the closure onto the cup, thus making later removal more difficult.

According to a fifth aspect, the closure comprises a one-way valve allowing for an external fluid, such as ambient air, to be suctioned into the cup. This measure allows for the aforementioned negative pressure to be eliminated, thus avoiding deformation of the cup.

The measures described in the first through fifth aspects may be provided individually or in combination in assemblies and measures according to this disclosure.

According to another aspect of this disclosure, an automatic dispenser is provided comprising any of the aforementioned assemblies.

Additional advantageous embodiments are set forth in the dependent claims.

BRIEF DESCRIPTION OF THE DRAWINGS

Aspects of the invention will be discussed below by reference to the following figures, without being limited thereby; the same or similar components are designated by the same reference numbers.

DETAILED DESCRIPTION

Figure 1:
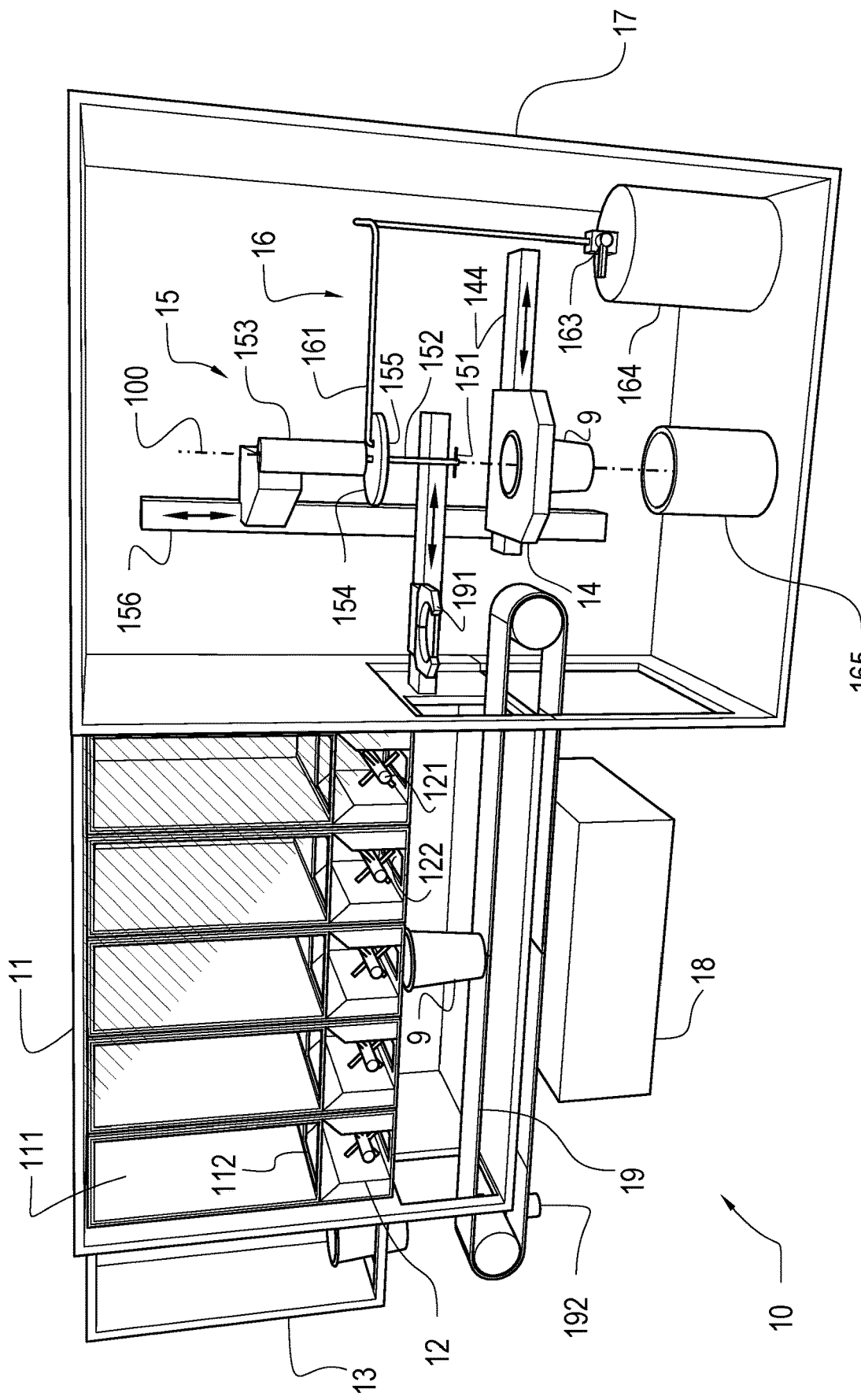
FIG. 1 shows one possible embodiment of an assembly according to aspects described herein.
Figure 6:
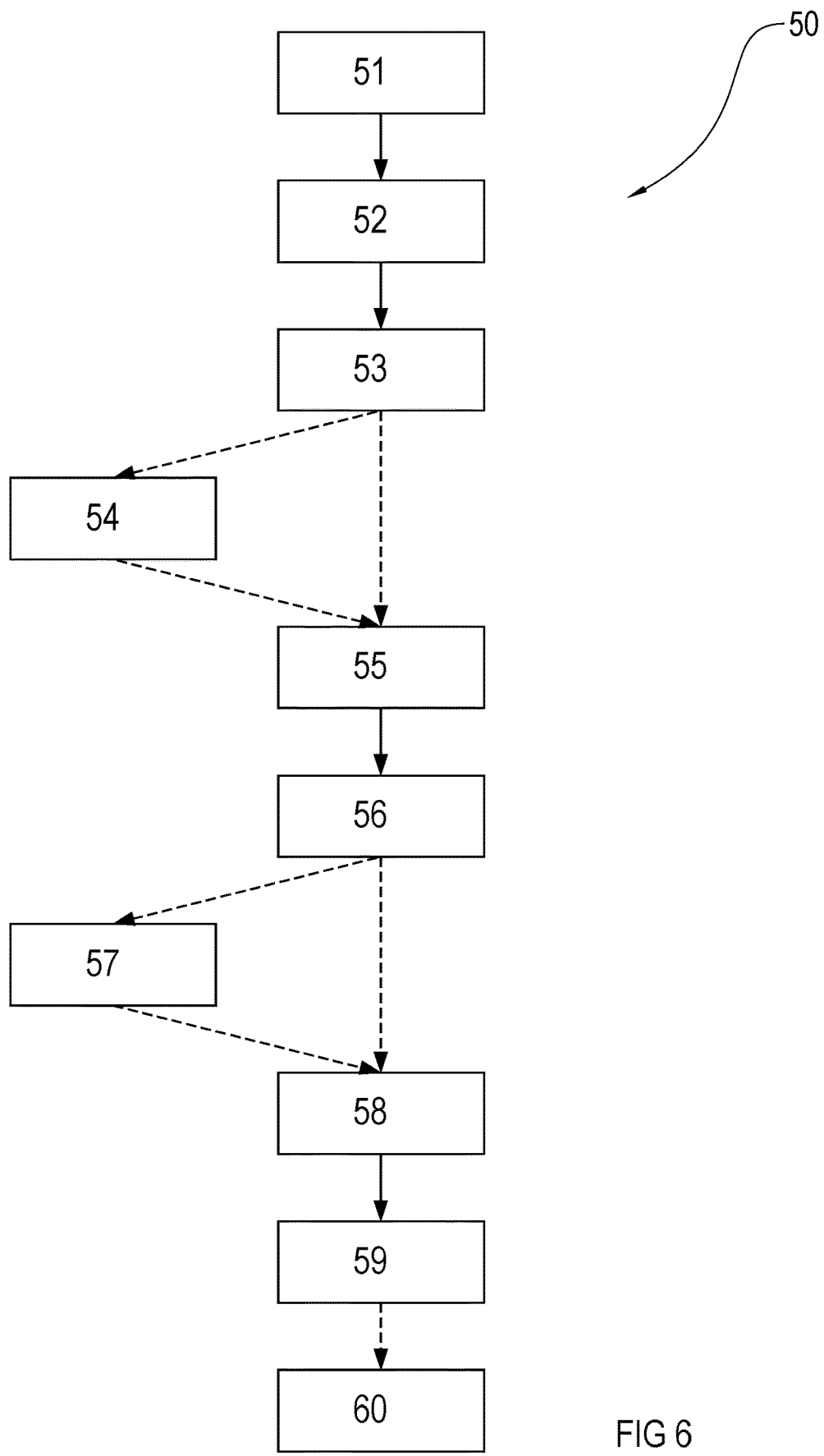
FIG. 6 shows a flowchart of methods according to aspects of this disclosure.

By Reference to FIG. 1, an assembly 10 for preparing a drink based on frozen Foods is shown. In the following, drinks of this type are referred to as 'smoothies'. In this disclosure, the term 'smoothie' refers to a drink consisting of fruit and/or vegetables that have been ground into pulp and a liquid, including without limitation water. FIG. 6 shows a flowchart of the method followed by the assembly of FIG. 1.

The assembly 10 comprises several containers 111, that each advantageously contain different types of frozen foods, or combinations of frozen foods. In order to store the various containers 111 and their content under deep-freeze conditions, they may be stored in a freezer compartment 11. The freezer compartment 11 ensures optimal storage of the foods, e.g., at a temperature below 0° C., advantageously less than or equal to −12° C., advantageously less than or equal to −15° C., advantageously less than or equal to −18° C. This latter storage temperature allows the frozen foods to be stored over longer periods of time under optimal conditions.

The foods in containers 111 are frozen products, and they are in these containers in the form of a granular material. The foods are preferably fruits and/or vegetables, which may have been cut into pieces before freezing, are frozen, and then packed in the containers 111. The foods in the containers 111 thus are in the form of coarser pieces, or even entire pieces of vegetable and fruit. The storage of vegetables and/or fruit in coarser pieces under deep-freeze conditions allows for optimal preservation of flavour and nutritional value, such that additives such as (artificial) flavour enhancers are not required and the purest product possible can be obtained. In the method 50 of FIG. 6, the storage of the foods in the form of a first granular material is shown in step 51. It should be noted that, in addition to frozen foods, additional containers (not shown) may be provided for other foods, e.g., dried foods such as nuts and herbs.

The average particle size of the granular material in at least some of the various containers 111 is advantageously at least 15, advantageously at least 20, advantageously at least 25, advantageously at least 30, advantageously at least 35, advantageously at least 40, advantageously at least 45, advantageously at least 50, advantageously at least 55 mm. The particle size refers to the size of the pieces of fruit and/or vegetable at the time of freezing. These pieces may adhere to one another and form aggregates during storage under deep-freeze conditions. Instead, one advantage of the use of coarser pieces is that there is a smaller contact surface, and thus less probability of the pieces adhering to one another. Additionally, it is simpler to break up these aggregates in the case of coarser pieces. The particle size refers in this case to the size of the separate components of these aggregates.

The particle size may be determined by the diameter of the smallest circumscribed sphere. The average particle size may be determined by known methods. One possibility is manual determination by measuring the particle size of a representative sample of pieces and calculating the average thereof. The aforementioned particle sizes advantageously relate to types of fruits and vegetables that, in their natural, intact form, have at least an average particle size as stated above. This is the case with fruits such as apples, pears, kiwis, mangos, pineapples, bananas, strawberries, etc. This is advantageously also the case with vegetables such as cabbages, e.g., cauliflower, root vegetables, and tubers, such as red beets, tomatoes, etc. Of course, the certain fruits and vegetables have a shape with smaller dimensions, e.g., certain berries. Such species are advantageously stored in the containers 111 in their unadulterated form.

Advantageously, each container 111 comprises a transparent wall visible from the outside. By storing the foods in larger pieces in the containers 111, they are more easily recognisable and also more attractive for an end user.

The assembly 10 further advantageously comprises a crusher 12 that is provided in order to crush the foods from at least some of the various containers 111 into a second granular material, thus reducing the average particle size. This operation corresponds to step 52 in the method 50 of FIG. 6. After crushing, the average particle size is advantageously 12 mm or smaller, advantageously 10 mm or smaller, advantageously 8 mm or smaller, advantageously 5 mm or smaller, advantageously 4 mm or smaller, advantageously 3 mm or smaller, advantageously 2 mm or smaller. The particles of the second granular material are advantageously still frozen upon leaving the crusher 12. The crusher 12 may have a known structure considering of a set of rotating blades 121. As shown in FIG. 1, a separate crusher (separate set of rotating blades 121), advantageously connected with an outlet 112 of a corresponding container 111, may be provided for each container 111. Alternatively, one crusher is provided for several, or even all, containers 111. In the latter case, a supply system is provided that connects the outlets 112 of several or all containers 111 with the crusher, i.e., with only one set of rotating blades 121. Such a supply system may consist of a funnel-shaped supply line.

The crusher 12 comprises an outlet 122 for the crushed material (second granular material), advantageously arranged above a platform 19. The distance between the outlet 122 and the platform 19 allows a cup 9 to be positioned, such that the second granular material from the crusher 12 can be received by the cup 9. Although this is not necessary, the platform is advantageously in the form of a conveyor 19. A conveyor 19 advantageously allows the cup 9 to be moved automatically along the outlets 122 of various crushers of the crusher 12. The conveyor 19 is advantageously driven by a motor 192 that is controlled by a controller 18. The controller 18 may be set or programmed to control the motor 192 such that the cup 9 is positioned under the desired outlets 122. Alternatively, an end user or operator may position the cup 9 manually.

According to step 53 of method 50, the cup 9 is filled with the desired foods from the containers 111. These may either be determined manually or set in a predetermined program in the controller 18. The amount of crushed food that reaches the cup 9 can be determined by weighing or volumetrically, e.g., by determining the number of rotations of the rotating blades 121. In the former case, the cup 9 or the container 111 may be weighed, such that the mass of the food supplied is determined. In this case, the platform 19 may be provided so as to determine a weight of the cup 9, or each container 111 is suspended on a weighing device (not shown).

The cup 9 thus filled is then placed in a grinder 15. This may occur manually by moving the cup from the platform 19 into a holder 14. In an automatic dispenser, such a movement is advantageously executed automatically, e.g., by providing a gripper 191 that is arranged so as to grip the cup 9 on the platform 19 and to move it to the holder 14.

According to step 56 of method 50 of FIG. 6, the grinder 15 is advantageously provided so as to grind the crushed foods in the cup into a drinkable mass that is advantageously flowable, advantageously homogeneous, and forms the smoothie. 'Grinding' refers to (further) reducing the size of the advantageously crushed foods into a pulp by cutting, shredding, and/or pureeing, thus rendering the particles small enough to be perceived by a user as a homogeneous mass.

Figure 2:
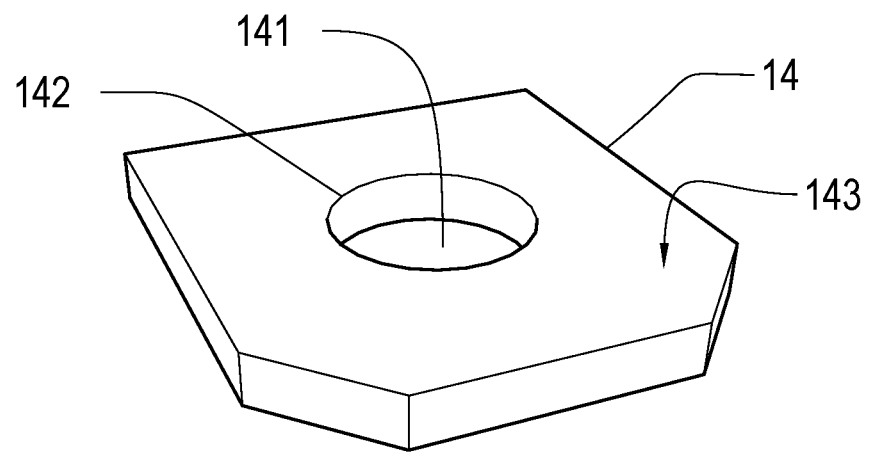
FIG. 2 is a perspective view of the holder of the assembly of FIG. 1, with which a cup is supported during the grinding of the ingredients in the cup.
Figure 3:
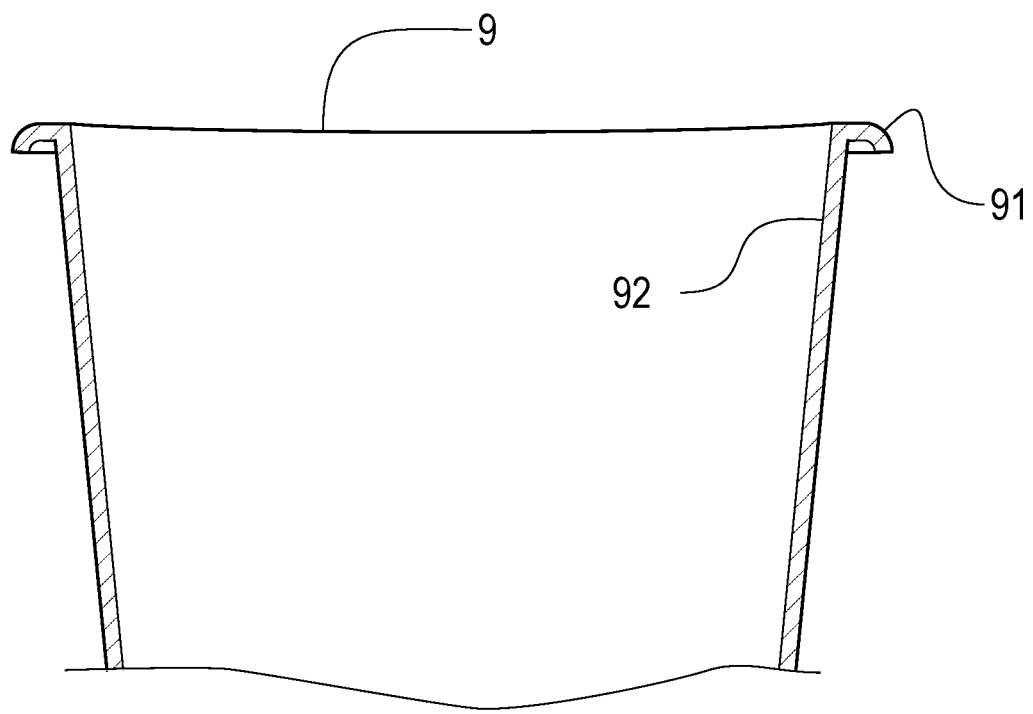
FIG. 3 is a partial cross-section of a cup that can advantageously be used in methods and assemblies according to the aspects described herein.
Figure 4:
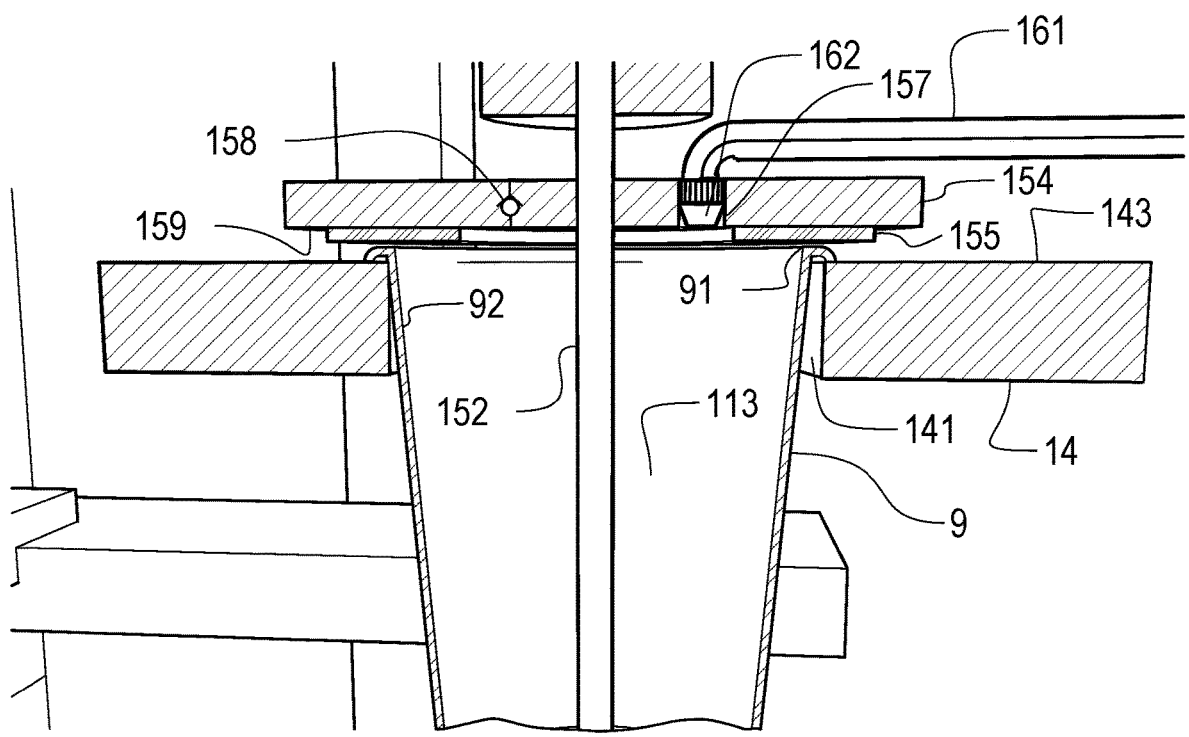
FIG. 4 is a cross-section of the closure of the cup that is supported by the holder of FIG. 2 during the grinding of the ingredients in the cup.

The holder 14 supports the cup 9 during grinding. In FIG. 2-4, the holder 14 comprises a through-hole 141 that is surrounded by an edge 142. The hole 141 has dimensions allowing the cup 9 to be received through it. The cup 9 is advantageously of the type with a protruding rim 91. The dimensions of the edge 142 of the holder advantageously match the dimensions of the edge 91 of the cup, such that edge 91 is supported on edge 142. Advantageously, the cup 9 is only suspended by the edge 91 in the holder. In the drawings, a cup with a circular rim is shown; of course, cups with rims of different shapes, e.g., polygonal or elliptical, may also be used.

It is possible to replace the conveyor 19 in the assembly of FIG. 1 with a horizontal linear guide along which the holder 14 is arranged. In this case, the holder 14 may advantageously be moved under the cup holder 13 and under the freezer 11. This horizontal linear guide may continue until below the axle 100. Thus, the gripper 191 is unnecessary.

The grinder 15 is advantageously rod-shaped, with an axle 152 provided on one end of one or several blades 151, and is driven by a motor 153 on an opposite end. Such grinders are known, e.g., blenders or mixers. This grinder 15 is advantageously arranged on a linear guide 156, such that it can be moved relative to the holder 14. Advantageously, the holder 14 and the grinder 15 are vertically aligned. For example, edge 142 and axle 152 are advantageously arranged concentrically on the axis 100, with the linear guide 156 arranged parallel to the axis 100. When the cup 9 is placed in the holder 14, e.g., manually or by means of the gripper 191, the grinder 15 is advantageously provided so as to be moved vertically by the guide 156, such that the axle 152 and the blades 151 enter the cup 9. Of course, an alternative arrangement, in which the holder 14 is vertically moved, whilst the grinder 15 is fixed relative to the housing 17, or in which both move, is also possible.

The grinding of the food by the grinder 12 has the advantage that the smaller pieces in the cup allow the axle 152 with blades 151 to enter the crushed food in the cup without difficulty. The forces required for the entry of the axle 152 remain limited, such that thin-walled cups or disposable cups may advantageously be used. The smaller pieces in the cup also limit the necessary starting torque for the blades 151, such that no heavy motor 152 is required.

A sealing cap 154 is arranged around the axle 152, and moves advantageously together with the axle 152. The sealing cap 154 is advantageously provided with a seal 155 along an underside. This seal 155 has a dimension that advantageously matches a dimension of the edge 142 of the holder 14 and/or the cup edge 91. When the grinder 15 is moved to the holder 14, the seal 155 will advantageously press on the edge 91 of the cup. This ensures a splash-proof seal of the cup during the grinding of the food 113 in the cup by the grinder 15. The closing of the cup corresponds to step 55 in the method 50 of FIG. 6.

By proper selection of the compression force applied by the seal 155 to the edge 91 of the cup, and partially due to the advantageously resilient material of the seal 155, e.g., an Elastomer, a friction arises that is sufficient to prevent the rotation of the cup 9 about the axis 100 during grinding. Thus, advantageously, cups with a circular edge may be used. Because such cups are commonly commercially available and thus cheaper than cups with a non-circular edge, the assemblies described herein are cheaper to use.

The protruding rim 91 is advantageously bent, as shown in FIG. 3. Such a bent protrusion 91 is known in disposable plastic cups. Such a bent edge may advantageously be used in the assemblies described herein. This edge 91 is advantageously compressible when the closing cap 154 clamps the protruding rim 91 to the edge 142 of the holder 14. This gives rise to a greater clamping force of the cup edge 91 between the holder 14 and the cap 154 (seal 155).

It is alternatively possible to arrange the seal 155 such that the inside of it contacts the cup wall 92 during closing. In such a case, the seal 155 thus has a smaller dimension than the edge 142 of the holder 14 and the edge 91 of the cup. Such an arrangement advantageously allows the (inner) rim of the cup to be perfectly held, making the presentation of the end product more attractive. Another alternative is to place the seal 155 at a distance from the edge 142/cup edge 91, i.e., the seal 155 has greater dimensions than the edge 142, such that, when the cap 154 is closed on the holder 14, the closure contacts an upper surface 143 of the holder 14. In the latter case, the seal 155 may be provided on the holder 14 instead of the closure cap 154. In the above alternative configurations of the seal, an underside 159 of the closure cap 154 that contacts the cup edge 91, the edge 142 of the holder, or both, during closing, is advantageously provided with a material having a suitable friction coefficient when in contact with the material of the cup 9, and prevents rotation of the cup 9 during grinding. Possible materials include an elastomer, silicone, etc.

Advantageously, the closure cap 154 may be moved relative to the axle 152. This is advantageous in particular in embodiments in which the axle 152 executes an up-and-down movement during grinding.

In reference to FIG. 1, the assembly 10 further advantageously comprises a liquid supply 16, provided in order to supply a liquid to the cup 9, advantageously prior to the grinding by the grinder 15 and advantageously following the filling of the cup with the ground food 113. This operation corresponds to optional step 54 in the method 50 of FIG. 6. This liquid, which is advantageously, but not necessarily, water, is advantageously supplied to the cup 9, which is supported by the holder 14, via a supply line 161 connected to a nozzle 162. The liquid supply is advantageously controlled by a shut-off valve 163 that is advantageously controlled by the controller 18. The liquid supply 16 advantageously further comprises a boiler 164 that is provided in order to heat the liquid to a desired temperature.

In reference to FIG. 4, the nozzle 162 is advantageously provided in an opening 157 of the closure cap 154. Advantageously, a quantity of liquid is added to the cup via the nozzle 162 before the cup is sealed by the seal 155. This may be provided, e.g., by coordinated control of the movements of the guide 156 and the closure cap 163, and may be carried out optionally by suitable settings or programming of the controller 18.

Advantageously, the foods 113, together with a quantity of the liquid provided by the supply line 161, are ground in the cup 9, as shown by step 56 in the method 50 of FIG. 6. The liquid may ensure better and/or faster grinding or chopping of the food. A possible explanation for this is that the addition of a small quantity of water, advantageously at a higher temperature, softens the food in the cup, such that the grinding is faster and more efficient. This is important because an overly long operating time of the grinder 15 would cause an excessive increase in the temperature of the smoothie in the cup 9, thus rendering the drink unappetising. When the food is additionally crushed whilst being filled into the cup, the time required for grinding is advantageously further reduced. The liquid is advantageously water, but may also be milk, coffee, or fruit juice.

The liquid, advantageously water without flavouring or sweeteners, is advantageously supplied to the cup 9 at a temperature of at least 50° C., advantageously at least 55° C., advantageously at least 60° C., advantageously at least 65° C., advantageously 70° C. or more, advantageously 72° C. or more, which corresponds to the pasteurising temperature. The inventers have surprisingly found that, if temperature of the liquid supplied is too low, it has an inadequate softening effect, causing the food 113 to behave as a compacted mass and reducing the grinding to a minimum. The temperature of the liquid is advantageously no higher than 90° C., advantageously no higher than 85° C., in order to avoid unnecessary increases in the temperature of the finished smoothie.

An ideal temperature of the smoothie at the end of the grinding process is advantageously between 0 and 15° C., advantageously at least 2° C., advantageously at least 3° C., and advantageously no higher than 10° C., advantageously no higher than 6° C. An optimal temperature is approximately 4° C. Such a final temperature may be advantageously obtained by proper selection of the grinding time in the cup, the weight ratio between the foods in the cup and the liquid supplied for grinding, the temperature of the liquid supplied, or any combination of these parameters. It should be noted that not all fruits and vegetables have the same water content, such that the aforementioned weight ratio may vary between formulations.

A further surprising discovery is that, during grinding, negative pressure arises in the cup 9, likely due to the cooling of the air in the cup. With thin-walled, e.g., plastic, cups, this gives rise to the possibility of deformation of the cup, causing the blades 151 to hit the wall and damage the cup. The closure cap 154 is thus advantageously provided with a one-way valve 158. The one-way valve 158 is configured so as to allow air in the cup, whilst preventing the escape of air or liquid from the cup.

Additionally or alternatively, a small amount of liquid may be added to the cup 9 via the nozzle 162 at the end of the grinding process. This surprisingly ensures easy release of the closure cap 154 from the cup 91 edge, and prevents the cup being lifted from the holder due to an upward movement of the closure cap 154 at the end of the preparation of the smoothie. The controller 18 may thus be programmed or set so as to control the closure cap 163 in a corresponding manner. The addition of liquid at the end of the grinding process is shown in optional step 57 in the method 50 of FIG. 6.

Once the grinder 15 has finished grinding the food 113 in the cup, the closure cap 154 and the grinder 15 move upwards (relative to the holder 14), such that the axle 152 and the blades 151 exit the cup. The closure cap and the axle 152 may move together or be controlled separately. The cup 9 now contains the finished smoothie and is ready to be served. To this end, the cup may be lifted manually or automatically from the holder 14. The opening of the cup is shown by step 58 in the method 50 of FIG. 6, followed by a step 59 of serving the cup.

Figure 5:
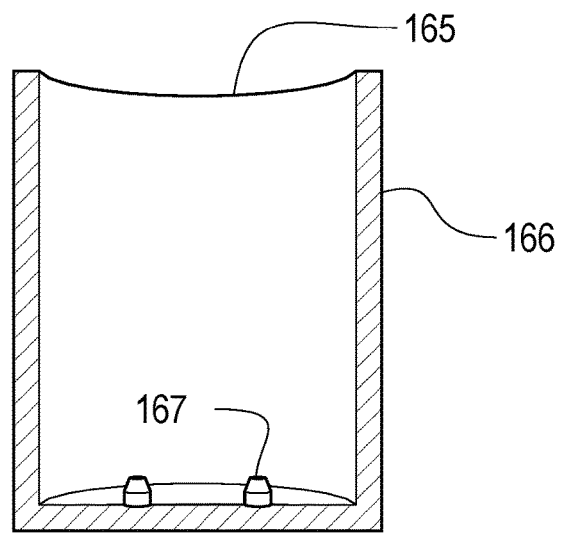
FIG. 5 shows a cross-section of the cleaning station of FIG. 1.

Advantageously, the holder 14 is configured so as to be movable relative to the housing 17. For example, the holder 14 may advantageously be horizontally movable in order to move the cup into a position 144, whilst the holder 14 does not obstruct a vertical path of the grinder 15 along the axis 100. This position 144 may additionally be a serving position for the cup. With the holder 14 in the position 144, the grinder 15 is free to move vertically to a cleaning station 165 that is advantageously arranged at a lower level relative to the holder 14. With reference to FIG. 5, the cleaning station 165 advantageously comprises a tubular housing 166 that is provided to receive the axle 152 and the blades 151 of the grinder 15. The tube for the housing 166 advantageously has dimensions corresponding to those of the closure cap 154, such that the housing 166 can be closed by the closure cap 154. The dimensions of the tube 166 are advantageously greater than the diameter of the cup edge 91, such that all parts that may come in contact with food can be cleaned. The cleaning station 165 is advantageously provided with sprayers 167 in order to clean the blades 151 and the axle 152, as well as the closure cap 154. This operation is shown as step 60 in the method 50 of FIG. 6. Advantageously, water, advantageously obtained from the same boiler 164 and thus having the same temperature as the water added to the cup via the supply line 161, for the cleaning process. Alternatively, the cleaning station 165 may be configured so as to add a detergent to the sprayers 167. Such a configuration of the cleaning station, in which the closure cap 154 can serve both to close the cup 9 and to close the cleaning station, allows for an extremely compact design requiring a minimal amount of cleaning liquid.

Because the grinding occurs in a cup 9 that is served to an end user, only a limited number of parts require cleaning, thus requiring less water for cleaning. The total surface area that comes into contact with the food is also minimised, thus reducing the likelihood of bacteria growth and allowing for fast, efficient cleaning. Due to the limited surface area, which is further (sic) during grinding and possibly during crushing, assemblies may be made as transparent as possible for the end user. For example, the freezer 11 may be provided together with the crusher 12 behind a transparent wall, allowing the end user to see the content of the containers 111. The housing 17 may also be provided with a fully transparent door (not shown). Indeed, only the seal 155 and the underside of the closure cap 154, together with the blades 151 become dirty during the grinding process and are cleaned in an extremely compact cleaning station 165. Additionally, by carrying out the grinding process directly in a cup that will be served, the aforementioned method for preparing a smoothie produces very little waste, thus making methods and assemblies according to aspects of the disclosure economic and environmentally friendly.

After cleaning the grinder 15 in the cleaning station 165, the grinder returns to an initial position, such that a new cup with food can be processed as described above. It should be noted that the grinder 15 may assume three different vertical positions, i.e., an uppermost position allowing the cup 9 to be positioned concentrically with the axis 100 in the holder 14, a second, middle, position, in which the blades 151 of the grinder enter the cup to grind the food therein, and, lastly, a third, lowermost, position consistent with the cleaning station.

Assemblies as described above may be provided as automatic dispensers. The controller 18 may for example be set or programmed with a number of smoothie recipes. In this case, a user makes a selection via a user interface (not shown) from amongst the recipes offered, whereupon the controller controls the various components of the assembly 10 so as to prepare the desired smoothie. Alternatively, the automatic dispenser may allow end users to choose a combination of ingredients from the ingredients offered in the various containers 111 themselves by means of a corresponding user interface.

For example, such a smoothie recipe may be used in the methods and systems described above. A cup 9 is filled with a quantity of frozen, crushed vegetables and/or fruit. A quantity of liquid, preferably water, at a temperature of at least 50° C., is supplied to the cup 9 via a supply line 16. The quantity of water supplied is preferably between 50 and 100 wt. % of the quantity of vegetables and/or fruit in the cup, preferably between 60 and 95 wt. % or between 70 and 90 wt. %. The mixture is ground in the cup by the grinder 15. After grinding in the cup, an additional 2-100 ml of water is added to the cup 10, preferably via the same liquid supply 16, in order to facilitate the opening of the closure cap 154. One possible recipe is, e.g., between 140 and 170 ml water, e.g., approximately 155 ml, for 175 g fruit and/or vegetables (frozen and crushed). After the grinding in the cup, and prior to the opening of the closure cap 154, an additional approximately 10 ml of water is added. The temperature of the water is, e.g., 85° C.

The invention claimed is:

1. A method for preparing a drink based on frozen food, comprising:
   storing frozen food in a plurality of containers in a form of first granular materials and under deep-freeze conditions;
   automatically supplying a portion of at least one of the first granular materials to a crusher device;
   crushing the portion of the supplied at least one of the first granular materials into a second granular material, wherein the second granular material has a second average particle size that is smaller than or equal to 12 mm and is smaller than a first average particle size of the corresponding at least one of the first granular materials;
   placing the second granular material into a cup;
   adding a first liquid into the cup, wherein the first liquid has a temperature of at least 50° C.; and
   closing the cup and grinding the second granular material together with the first liquid in the cup into a drinkable mass.

2. The method according to claim 1, further comprising introducing a rod-shaped grinder device into the cup, wherein the rod-shaped grinder device grinds the second granular material in the cup.

3. The method according to claim 2, further comprising cleaning the rod-shaped grinder device following the grinding of the second granular material.

4. The method according to claim 3, further comprising moving the rod-shaped grinder device from a first position, corresponding to grinding the second granular material in the cup to a second position, corresponding to the cleaning of the rod-shaped grinder device, wherein the first position and the second position are vertically aligned with one another and spaced apart.

5. The method according to claim 1, wherein the first average particle size is greater than or equal to 15 mm.

6. The method according to claim 5, wherein the second average particle size is smaller than or equal to 5 mm.

7. The method according to claim 1, comprising adding a second liquid into the cup after grinding the second granular material.

8. The method according to claim 1, wherein a portion of each of several of the first granular materials from several of the plurality of containers is separately crushed into a corresponding second granular material, and is supplied to the cup.

9. The method according to claim 1, wherein a mass ratio between the second granular material and the first liquid, and the temperature of the first liquid, are selected such that the drinkable mass has a temperature between 0° C. and 15° C. following grinding.

10. The method of claim 1, further comprising opening and serving the cup.

\* \* \* \* \*